UNITED STATES PATENT OFFICE.

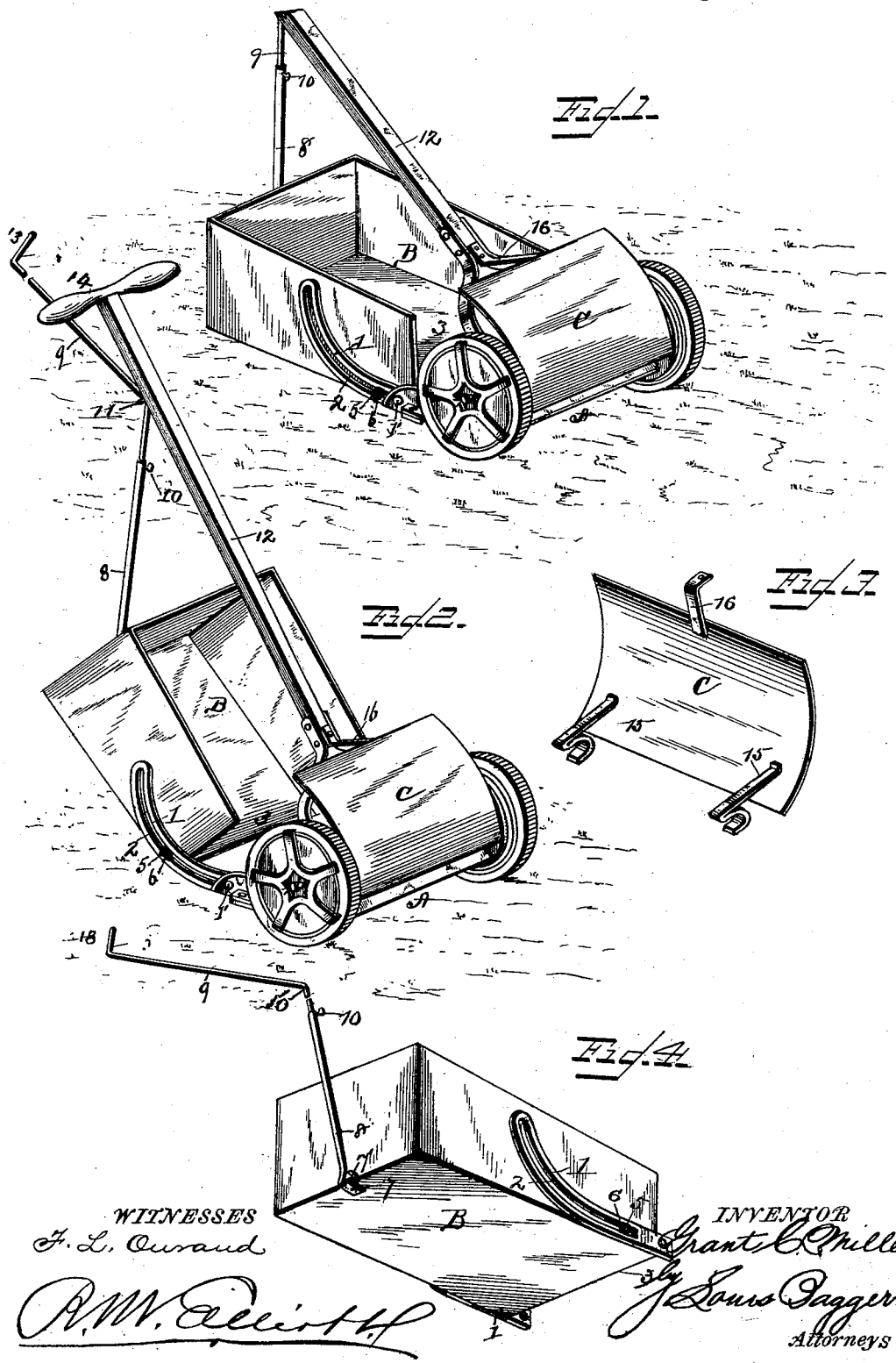

GRANT C. MILLER, OF MOUNT VERNON, IOWA.

GRASS-CATCHING ATTACHMENT FOR LAWN-MOWERS.

SPECIFICATION forming part of Letters Patent No. 409,053, dated August 13, 1889.

Application filed November 3, 1888. Serial No. 289,895. (No model.)

*To all whom it may concern:*

Be it known that I, GRANT C. MILLER, a citizen of the United States, and a resident of Mount Vernon, in the county of Linn and State of Iowa, have invented certain new and useful Improvements in Grass-Catching Attachments to Lawn-Mowers; and I do hereby declare that the following is a full, clear, and exact description of the invention, which will enable others skilled in the art to which it appertains to make and use the same.

This invention relates to a grass-catching attachment for lawn-mowers.

The object is to produce an attachment for lawn-mowers by means of which all of the grass may be caught as it is cut, thus rendering it unnecessary to clean a lawn after a machine using this attachment has passed over it.

The invention consists in the construction and novel combination of parts hereinafter described, illustrated in the accompanying drawings, and pointed out in the appended claim.

In the accompanying drawings, forming part of this specification, and in which like letters of reference indicate corresponding parts, Figure 1 is a perspective view showing the box and deflector in place on the lawn-mower in position to catch the grass as it is cut. Fig. 2 is a perspective view showing the box raised in the position necessary to cause it to discharge its load. Fig. 3 is a perspective detail view of the deflector; and Fig. 4 is a perspective view taken from the under side of the box, showing the rod for tilting the same and the curved arms secured on the sides.

Referring to the drawings by letter, A designates an ordinary lawn-mower, to the frame of which, at the rear end, are attached by bolts 1' two rearwardly-extending upwardly-curved arms 1, provided with the concentric curved slots 2, extending nearly their entire length.

B designates the box for containing the cut grass, the front 3 of which is left open and stands up close to the cutters of the lawn-mower. At a point near the lower end of said front end portion are secured two bolts 5, which are designed to engage in the curved slots 2 and engage the nuts 6 on the outer side of said slots.

To the under side of the box, at or near its rear end, is secured a shoulder 7, provided with an opening, in which engages the hooked lower end 7' of the arm-rod 8. The said arm is provided with an axial recess extending from its upper end. The said recess is open at top, but closed on the sides.

9 is a rod the lower end of which is inserted in said recess and retained at the desired point therein by a set-screw 10. This rod is bent at 10', Fig. 4, and the said bend fits loosely in a staple 11, secured to the tongue 12 on the under side thereof, the part of the rod 9 outward from its bend being below said surface. The tongue has at the lower end diverging arms, as shown, which are attached in the usual or any suitable manner to the frame of the cutter, and at its upper or outer end the cross-piece or handle 14, as shown in Fig. 2. The bend 10' rests in the staple 11, and when the machine is in the position shown in Fig. 2 the said bend prevents the lower leg of the rod 9 from falling downward. The outer or upper leg of the rod 9 is designed to move inward through the staple 11, and has its end 13 turned up to form a stop, which impinges on the handle 14 and limits said inward motion. This prevents the rod from slipping out of the staple when the box is adjusted to receive grass.

C is the deflector, which is curved, as shown, so that it will direct the cut grass into the box.

Near the lower edge on the inner surface of the deflector are secured two hooks 15, which are designed to rest upon the axle between the wheels and near the latter. The deflector is attached to the tongue by the strap 16, extending from its upper edge. The box, when ready for use, stands near the ground and is approximately horizontal thereto. As the mower moves forward, the grass from the cutter-blades is thrown by the deflector over into the box.

The box may obviously be raised and lowered by pulling the rod 9 out through staple 11 or pushing it in therethrough. The rods 8 9 and set-screw 10 serve to adjust the height of the box.

The device can be readily detached when desirable or necessary.

Having described my invention, I claim—

The combination, with the tongue 12 and deflector C of a lawn-mower, which deflector is provided with the hooks 15, to rest on the axle of the mower, and the strap 16, to connect it with the tongue, of the staple 11, secured to the tongue, the box B, the upwardly-extending curved arms 1, provided with concentric slots 2, resting against the sides of the box and rigidly secured at their lower ends to the mower-frame, the bolts 5, attached to the sides of the box B, and their nuts 6, the shoulder 7, secured to the rear end of the floor of the box, the arm or rod 8, having its lower end bent and engaged in an opening in said shoulder and provided with a longitudinal inclosed recess extending from its upper end, the bent rod 9, passing through the staple 11, and the set-screw 10, to bind the two rods together at the proper points, substantially as specified.

In testimony that I claim the foregoing as my own I have hereunto affixed my signature in presence of two witnesses.

GRANT C. MILLER.

Witnesses:
 HENRY A. COLLIN,
 HORACE G. MILLER.